US006986020B2

(12) United States Patent
Barry et al.

(10) Patent No.: US 6,986,020 B2
(45) Date of Patent: Jan. 10, 2006

(54) METHODS AND APPARATUS FOR PROVIDING BIT-REVERSAL AND MULTICAST FUNCTIONS UTILIZING DMA CONTROLLER

(75) Inventors: Edwin F. Barry, Vilas, NC (US); Nikos P. Pitsianis, Durham, NC (US); Kevin Coopman, Redwood City, CA (US)

(73) Assignee: PTS Corporation, San Jose, CA (US)

( * ) Notice: Subject to any disclaimer, the term of this patent is extended or adjusted under 35 U.S.C. 154(b) by 17 days.

(21) Appl. No.: 10/946,261

(22) Filed: Sep. 21, 2004

(65) Prior Publication Data

US 2005/0038936 A1 Feb. 17, 2005

Related U.S. Application Data

(62) Division of application No. 09/791,940, filed on Feb. 23, 2001, now Pat. No. 6,834,295.

(60) Provisional application No. 60/184,668, filed on Feb. 24, 2000.

(51) Int. Cl.
*G06F 15/80* (2006.01)

(52) U.S. Cl. .................... 712/10; 712/14; 712/35; 710/22; 710/27

(58) Field of Classification Search ................ 712/10, 712/11, 14, 35; 710/22, 27
See application file for complete search history.

(56) References Cited

U.S. PATENT DOCUMENTS 5,161,156 A * 11/1992 Baum et al. .................... 714/4
5,864,738 A * 1/1999 Kessler et al. .............. 709/239

* cited by examiner

*Primary Examiner*—William M. Treat
(74) *Attorney, Agent, or Firm*—Priest & Goldstein, PLLC

(57) ABSTRACT

Techniques for providing improved data distribution to and collection from multiple memories are described. Such memories are often associated with and local to processing elements (PEs) within an array processor. Improved data transfer control within a data processing system provides support for radix 2, 4 and 8 fast Fourier transform (FFT) algorithms through data reordering or bit-reversed addressing across multiple PEs, carried out concurrently with FFT computation on a digital signal processor (DSP) array by a DMA unit. Parallel data distribution and collection through forms of multicast and packet-gather operations are also supported.

8 Claims, 9 Drawing Sheets

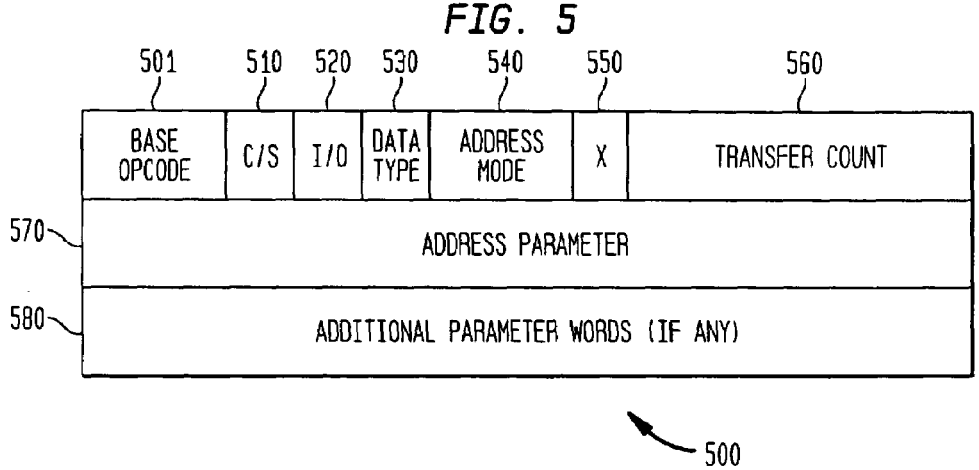

| 31 30 | 29 28 27 26 | 25 24 | 23 22 21 20 19 18 17 16 15 14 13 12 11 10 09 08 | 07 06 05 04 03 02 01 00 |
|---|---|---|---|---|
| 00 | 0110 | MA TYPE 01 | (USED FOR 2x4 TRANSLATE TABLE) | 2x2 TABLE |
| USED FOR 4x4 TRANSLATE TABLE ||||||

| | |
|---|---|
| 2x2 TABLE | CONTAINS A TABLE OF TWO BIT PE IDs. A SEQUENCE OF TWO BIT VALUES (STARTING WITH 0) WHICH SPECIFY THE PE VID, ARE APPLIED AS AN INDICES INTO THIS TABLE WHEN ONE OF THE PE ADDRESSING MODES IS USED IN A TRANSFER INSTRUCTION. THE TRANSLATED VALUE IS THEN USED TO PERFORM THE MEMORY ACCESS. WITH THIS APPROACH, PEs MAY BE ACCESSED IN ANY ORDER FOR THESE MODES. |
| MA TYPE | ManArray TYPE SPECIFIES THE CONFIGURATION TARGETED AND THEREFORE THE SIZE OF THE TABLE. 00-1x2 (UP TO 2 PEs) 01-2x2 (UP TO 4 PEs) 10-2x4 (UP TO 8 PEs) 11-4x4 (UP TO 16 PEs) |

| 31 30 29 28 27 26 25 24 23 22 21 20 19 18 17 16 15 14 13 12 11 10 09 08 | 07 06 | 05 04 | 03 02 | 01 00 |
|---|---|---|---|---|
| USED FOR PE ID TRANSLATION TABLES LARGER THAN 4 ELEMENTS | PID3 | PID2 | PID1 | PID0 |

RESET VALUE: 0x00000000          ACCESS: READ/WRITE

| 31 30 29 28 27 26 25 24 23 22 21 20 19 18 17 16 15 14 13 12 11 10 09 08 07 06 05 04 | 03 02 01 00 |
|---|---|
| RESERVED | BitRev CODE |

FIG. 11

| BITREV | PE LOCAL MEMORY DATA | SYSTEM MEMORY DATA | RADIX | FFT SIZE N |
|---|---|---|---|---|
| 0x00 | NO REVERSAL | NO REVERSAL | | |
| 0x01 | REVERSED | IN-ORDER | 2 | 64 |
| 0x02 | REVERSED | IN-ORDER | 2 | 128 |
| 0x03 | REVERSED | IN-ORDER | 2 | 256 |
| 0x04 | REVERSED | IN-ORDER | 2 | 512 |
| 0x05 | REVERSED | IN-ORDER | 2 | 1024 |
| 0x06 | REVERSED | IN-ORDER | 2 | 2048 |
| 0x07 | REVERSED | IN-ORDER | 4 | 64 |
| 0x08 | REVERSED | IN-ORDER | 4 | 256 |
| 0x09 | REVERSED | IN-ORDER | 4 | 1024 |
| 0x0a | REVERSED | REVERSED | 4 | 64 |
| 0x0b | REVERSED | REVERSED | 4 | 256 |
| 0x0c | REVERSED | REVERSED | 4 | 1024 |
| 0x0d | REVERSED | IN-ORDER | 8 | 64 |
| 0x0e | REVERSED | IN-ORDER | 8 | 512 |
| 0x0f | REVERSED | REVERSED | 8 | 64 |
| 0x10 | REVERSED | REVERSED | 8 | 512 |

| BitRev CODE | PE ADDRESS BIT | | | | | | | | | | | | | |
|---|---|---|---|---|---|---|---|---|---|---|---|---|---|---|
| NO REVERSAL | 13 | 12 | 11 | 10 | 9 | 8 | 7 | 6 | 5 | 4 | 3 | 2 | 1 | 0 |
| 0x01 | 13 | 12 | 11 | 10 | 9 | 8 | 2 | 3 | 4 | 5 | 6 | 7 | 1 | 0 |
| 0x02 | 13 | 12 | 11 | 10 | 9 | 2 | 3 | 4 | 5 | 6 | 7 | 8 | 1 | 0 |
| 0x03 | 13 | 12 | 11 | 10 | 2 | 3 | 4 | 5 | 6 | 7 | 8 | 9 | 1 | 0 |
| 0x04 | 13 | 12 | 11 | 2 | 3 | 4 | 5 | 6 | 7 | 8 | 9 | 10 | 1 | 0 |
| 0x05 | 13 | 12 | 2 | 3 | 4 | 5 | 6 | 7 | 8 | 9 | 10 | 11 | 1 | 0 |
| 0x06 | 13 | 2 | 3 | 4 | 5 | 6 | 7 | 8 | 9 | 10 | 11 | 12 | 1 | 0 |
| 0x07 | 13 | 12 | 11 | 10 | 9 | 8 | 3 | 2 | 5 | 4 | 7 | 6 | 1 | 0 |
| 0x08 | 13 | 12 | 11 | 10 | 3 | 2 | 5 | 4 | 7 | 6 | 9 | 8 | 1 | 0 |
| 0x09 | 13 | 12 | 3 | 2 | 5 | 4 | 7 | 6 | 9 | 8 | 11 | 10 | 1 | 0 |
| 0x0a | 13 | 12 | 11 | 10 | 9 | 8 | 6 | 7 | 4 | 5 | 2 | 3 | 1 | 0 |
| 0x0b | 13 | 12 | 11 | 10 | 8 | 9 | 6 | 7 | 4 | 5 | 2 | 3 | 1 | 0 |
| 0x0c | 13 | 12 | 10 | 11 | 8 | 9 | 6 | 7 | 4 | 5 | 2 | 3 | 1 | 0 |
| 0x0d | 13 | 12 | 11 | 10 | 9 | 8 | 4 | 3 | 2 | 7 | 6 | 5 | 1 | 0 |
| 0x0e | 13 | 12 | 11 | 4 | 3 | 2 | 7 | 6 | 5 | 10 | 9 | 8 | 1 | 0 |
| 0x0f | 13 | 12 | 11 | 10 | 9 | 8 | 5 | 6 | 7 | 2 | 3 | 4 | 1 | 0 |
| 0x10 | 13 | 12 | 11 | 8 | 9 | 10 | 5 | 6 | 7 | 2 | 3 | 4 | 1 | 0 |
| INPUTS PER OUTPUT ADDRESS BIT | 1 | 2 | 4 | 6 | 6 | 8 | 6 | 7 | 7 | 8 | 8 | 11 | | |

METHODS AND APPARATUS FOR PROVIDING BIT-REVERSAL AND MULTICAST FUNCTIONS UTILIZING DMA CONTROLLER

This application is a divisional of U.S. application Ser. No. 09/791,940 filed Feb. 23, 2001 and claims the benefit of U.S. Provisional Application Ser. No. 60/184,668 filed Feb. 24, 2000 and are incorporated by reference herein in their entirety.

FIELD OF THE INVENTION

The present invention relates generally to improvements in array processing, and more particularly to advantageous techniques for providing improved methods and apparatus for data distribution to and collection from multiple memories often associated with and local to processing elements within an array processor.

BACKGROUND OF THE INVENTION

Various prior art techniques exist for the transfer of data between system memories or between system memories and input/output (I/O) devices. FIG. 1 shows a conventional data processing system 100 comprising a processor local memory 110, a host uniprocessor 120, I/O devices 130 and 140, system memory 150 which is usually a larger memory store with longer access delay than the processor local memory, and a direct memory access (DMA) controller 160.

The DMA controller 160 provides a mechanism for transferring data between processor local memory and system memory or I/O devices concurrent with uniprocessor execution. DMA controllers are sometimes referred to as I/O processors or transfer processors in the literature. System performance is improved since the host uniprocessor can perform computations while the DMA controller is transferring new input data to the processor local memory and transferring result data to output devices or the system memory. A data transfer between a source and a destination is typically specified with the following minimum set of parameters: source address, destination address, and number of data elements to transfer. Addresses are interpreted by the system hardware and uniquely specify I/O devices or memory locations from which data must be read or to which data must be written. Sometimes additional parameters are provided such as data element size. One of the limitations of conventional DMA controllers is that address generation capabilities for the data source and data destination are often constrained to be the same. For example, when only a source address, destination address and a transfer count are specified, the implied data access pattern is block-oriented, that is, a sequence of data words from contiguous addresses starting with the source address is copied to a sequence of contiguous addresses starting at the destination address. Array processing presents challenges for data transfer both in terms of addressing flexibility, control and performance. The patterns in which data elements are distributed and collected from PE local memories can significantly affect the overall performance of the processing system. One important application is fast Fourier transform (FFT) processing which uses bit-reversed addressing to reorder the data elements. With the advent of the manifold array (ManArray) architecture, it has been recognized that it will be advantageous to have improved techniques for data transfer which efficiently provide these and other capabilities and which are tailored to this new architecture.

SUMMARY OF THE INVENTION

As described in greater detail below, the present invention addresses a variety of advantageous approaches for improved data transfer control within a data processing system. In particular, improved techniques are provided for:

(1) Supporting radix 2, 4 and 8 fast Fourier transform algorithms through efficient data reordering or "bit-reversed addressing" across multiple processing elements (PEs), carried out concurrently with FFT computation by a digital signal processor (DSP), and (2) Parallel data distribution and collection through efficient forms of multicast and "packing-gather" operations.

These and other aspects and advantages of the present invention will be apparent from the drawings and the Detailed Description which follow.

BRIEF DESCRIPTION OF THE DRAWINGS

FIG. 5 shows an exemplary format of a transfer type instruction;

FIG. 6 shows an example of virtual to physical PE ID translation;

FIG. 8 shows an exemplary PE translation (PEXLAT) instruction format ("load VID-to-PID table");

FIG. 9 shows an exemplary VID-to-PID translation table register, called the PETABLE register in a presently preferred embodiment;

FIG. 10 shows illustrative bit reversal (BitRev) code suitable for carrying out an address transformation for several FFT sizes and processing methods in accordance with the present invention;

FIG. 11 shows an exemplary encoding table for the BitRev code of FIG. 10; and

FIG. 12 shows a further exemplary encoding table including PE and address bits for the BitRev code of FIG. 10.

DETAILED DESCRIPTION

Figure 1:
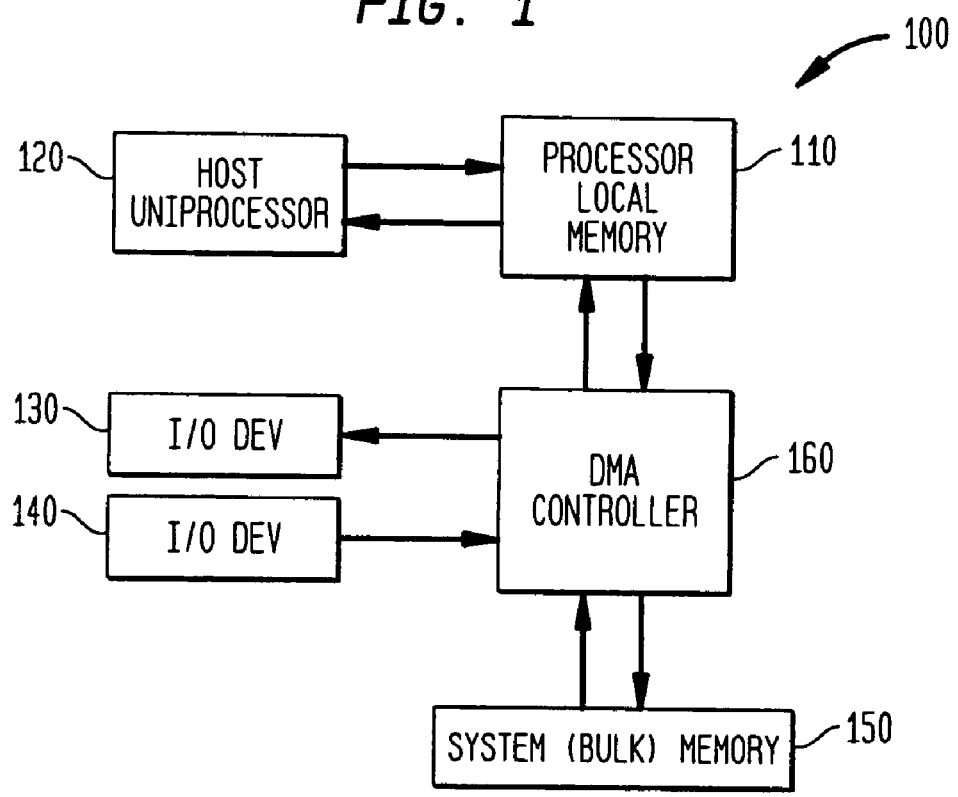
FIG. 1 shows a conventional data processing system with a DMA controller to support data transfers concurrent with host processor computation.

Further details of a presently preferred ManArray DSP core, architecture, and instructions for use in conjunction with the present invention are found in U.S. patent application Ser. No. 08/885,310 filed Jun. 30, 1997, now U.S. Pat. No. 6,023,753, U.S. patent application Ser. No. 08/949,122 filed Oct. 10, 1997, U.S. patent application Ser. No. 09/169,255 filed Oct. 9, 1998, U.S. patent application Ser. No. 09/169,256 filed Oct. 9, 1998, U.S. patent application Ser. No. 09/169,072 filed Oct. 9, 1998, U.S. patent application Ser. No. 09/187,539 filed Nov. 6, 1998, U.S. patent application Ser. No. 09/205,558 filed Dec. 4, 1998, U.S. patent application Ser. No. 09/215,081 filed Dec. 18, 1998, U.S. patent application Ser. No. 09/228,374 filed Jan. 12, 1999 and entitled "Methods and Apparatus to Dynamically Reconfigure the Instruction Pipeline of an Indirect Very Long Instruction Word Scalable Processor", U.S. patent application Ser. No. 09/238,446 filed Jan. 28, 1999, U.S. patent application Ser. No. 09/267,570 filed Mar. 12, 1999, U.S. patent application Ser. No. 09/337,839 filed Jun. 22, 1999, U.S. patent application Ser. No. 09/350,191 filed Jul. 9, 1999, U.S. patent application Ser. No. 09/422,015 filed Oct. 21, 1999 entitled "Methods and Apparatus for Abbreviated Instruction and Configurable Processor Architecture", U.S. patent application Ser. No. 09/432,705 filed Nov. 2, 1999 entitled "Methods and Apparatus for Improved Motion Estimation for Video Encoding", U.S. patent application Ser. No. 09/471,217 filed Dec. 23, 1999 entitled "Methods and Apparatus for Providing Data Transfer Control", U.S. patent application Ser. No. 09/472,372 filed Dec. 23, 1999 entitled "Methods and Apparatus for Providing Direct Memory Access Control", U.S. patent application Ser. No. 09/596,103 entitled "Methods and Apparatus for Data Dependent Address Operations and Efficient Variable Length Code Decoding in a VLIW Processor" filed Jun. 16, 2000, U.S. patent application Ser. No. 09/598,567 entitled "Methods and Apparatus for Improved Efficiency in Pipeline Simulation and Emulation" filed Jun. 21, 2000, U.S. patent application Ser. No. 09/598,564 entitled "Methods and Apparatus for Initiating and Resynchronizing Multi-Cycle SIMD Instructions" filed Jun. 21, 2000, U.S. patent application Ser. No. 09/598,566 entitled "Methods and Apparatus for Generalized Event Detection and Action Specification in a Processor" filed Jun. 21, 2000, and U.S. patent application Ser. No. 09/598,084 entitled "Methods and Apparatus for Establishing Port Priority Functions in a VLIW Processor" filed Jun. 21, 2000, U.S. patent application Ser. No. 09/599,980 entitled "Methods and Apparatus for Parallel Processing Utilizing a Manifold Array (ManArray) Architecture and Instruction Syntax" filed Jun. 22, 2000, U.S. patent application Ser. No. 09/791,256 entitled "Methods and Apparatus for Scalable Array Processor Interrupt Detection and Response" filed Feb. 23, 2001, U.S. patent application Ser. No. 09/792,819 entitled "Methods and Apparatus for Dual-Use Coprocessing/Debug Interface" filed Feb. 23, 2001, as well as, Provisional Application Ser. No. 60/113,637 entitled "Methods and Apparatus for Providing Direct Memory Access (DMA) Engine" filed Dec. 23, 1998, Provisional Application Ser. No. 60/113,555 entitled "Methods and Apparatus Providing Transfer Control" filed Dec. 23, 1998, Provisional Application Ser. No. 60/139,946 entitled "Methods and Apparatus for Data Dependent Address Operations and Efficient Variable Length Code Decoding in a VLIW Processor" filed Jun. 18, 1999, Provisional Application Ser. No. 60/140,245 entitled "Methods and Apparatus for Generalized Event Detection and Action Specification in a Processor" filed Jun. 21, 1999, Provisional Application Ser. No. 60/140,163 entitled "Methods and Apparatus for Improved Efficiency in Pipeline Simulation and Emulation" filed Jun. 21, 1999, Provisional Application Ser. No. 60/140,162 entitled "Methods and Apparatus for Initiating and Re-Synchronizing Multi-Cycle SIMD Instructions" filed Jun. 21, 1999, Provisional Application Ser. No. 60/140,244 entitled "Methods and Apparatus for Providing One-By-One Manifold Array (1×1 ManArray) Program Context Control" filed Jun. 21, 1999, Provisional Application Ser. No. 60/140,325 entitled "Methods and Apparatus for Establishing Port Priority Function in a VLIW Processor" filed Jun. 21, 1999, Provisional Application Ser. No. 60/140,425 entitled "Methods and Apparatus for Parallel Processing Utilizing a Manifold Array (ManArray) Architecture and Instruction Syntax" filed Jun. 22, 1999, Provisional Application Ser. No. 60/165,337 entitled "Efficient Cosine Transform Implementations on the ManArray Architecture" filed Nov. 12, 1999, Provisional Application Ser. No. 60/171,911 entitled "Methods and Apparatus for DMA Word Memory" filed Dec. 23, 1999, Provisional Application Ser. No. 60/184,668 entitled "Methods and Apparatus for Providing Bit-Reversal and Multicast Functions Utilizing DMA Controller" filed Feb. 24, 2000, Provisional Application Ser. No. 60/184,529 entitled "Methods and Apparatus for Scalable Array Processor Interrupt Detection and Response" filed Feb. 24, 2000, Provisional Application Ser. No. 60/184,560 entitled "Methods and Apparatus for Flexible Strength Coprocessing Interface" filed Feb. 24, 2000, Provisional Application Ser. No. 60/203,629 entitled "Methods and Apparatus for Power Control in a Scalable Array of Processor Elements" filed May 12, 2000, Provisional Application Ser. No. 60/241,940 entitled "Methods and Apparatus for Efficient Vocoder Implementations" filed Oct. 20, 2000, and Provisional Application Ser. No. 60/251,072 entitled "Methods and Apparatus for Providing Improved Physical Designs and Routing with Reduced Capacitive Power Dissipation" filed Dec. 4, 2000, all of which are assigned to the assignee of the present invention and incorporated by reference herein in their entirety.

The following definitions of terms are provided as background for the discussion of the invention which follows below:

A "transfer" refers to the movement of one or more units of data from a source device (either I/O or memory) to a destination device (I/O or memory).

A data "source" or "destination" refers to a device from which data may be read or to which data may be written. Such a device provides a range of one or more contiguous addresses for reading and/or writing each of which corresponds to at least one data storage element. For some data sources and destinations, there may be many addresses which map to the same data storage location, or many storage locations that map to the same address. For example, an I/O device may be accessed using one of many addresses in a range of addresses, yet it will perform the same operation, such as returning the next data element of a FIFO queue, for any of them.

A "data access pattern" is a sequence of data source or destination addresses whose relationship to each other is periodic. For example, the sequence of addresses 0, 1, 2, 4, 5, 6, 8, 9, 10, . . . etc. is a data access pattern. If we look at the differences between successive addresses, we find: 1,1,2, 1,1,2, 1,1,2, . . . etc. Every three elements, the pattern repeats.

An "address mode" or "addressing mode" refers to a rule that describes a sequence of addresses, usually in terms of one or more parameters. For example, a "block" address mode is described by the rule: address[i]=base_address+i, where i=0, 1, 2, . . . etc. and where base_address is a parameter and refers to the starting address of the sequence. Another example is a "stride" address mode which may be described by the rule: address[i]= base_address+(i mod (stride−hold))+(i/hold)*stride for i=0, 1, 2, . . . etc., and where base_address, stride and hold are parameters, and where division is integer division such that any remainder is discarded.

An "address generation unit" (AGU) is a hardware module that generates a sequence of addresses (a data access pattern) according to a programmed address mode.

"End-of-transfer" (EOT) refers to the state when a transfer execution unit, as further described in the following text, has completed its most recent transfer instruction by transferring the last of the number of elements specified by the instruction's transfer count field.

The term "host processor" as used in the following descriptions is any processor or device which can write control commands and read status from the DMA controller and/or which can respond to DMA controller messages and signals. In general, a host processor interacts with the DMA controller to control and synchronize the flow of data between devices and memories in the system in such a way as to avoid overrun and underrun conditions at the sources and destinations of data transfers.

The present invention provides a set of flexible addressing modes for supporting efficient data transfers to and from multiple memories, together with mechanisms for allowing data accesses to be directed to PEs according to virtual as opposed to physical IDs. This section describes an exemplary DMA controller and its system environment that provides one context in which the present invention may be effectively used. The discussion below addresses PE memory addressing, virtual-to-physical PE ID translation and its purpose, and a set of PE memory addressing modes or "PE addressing modes" which support numerous parallel algorithms and processes with highly efficient data transfer.

Figure 2:
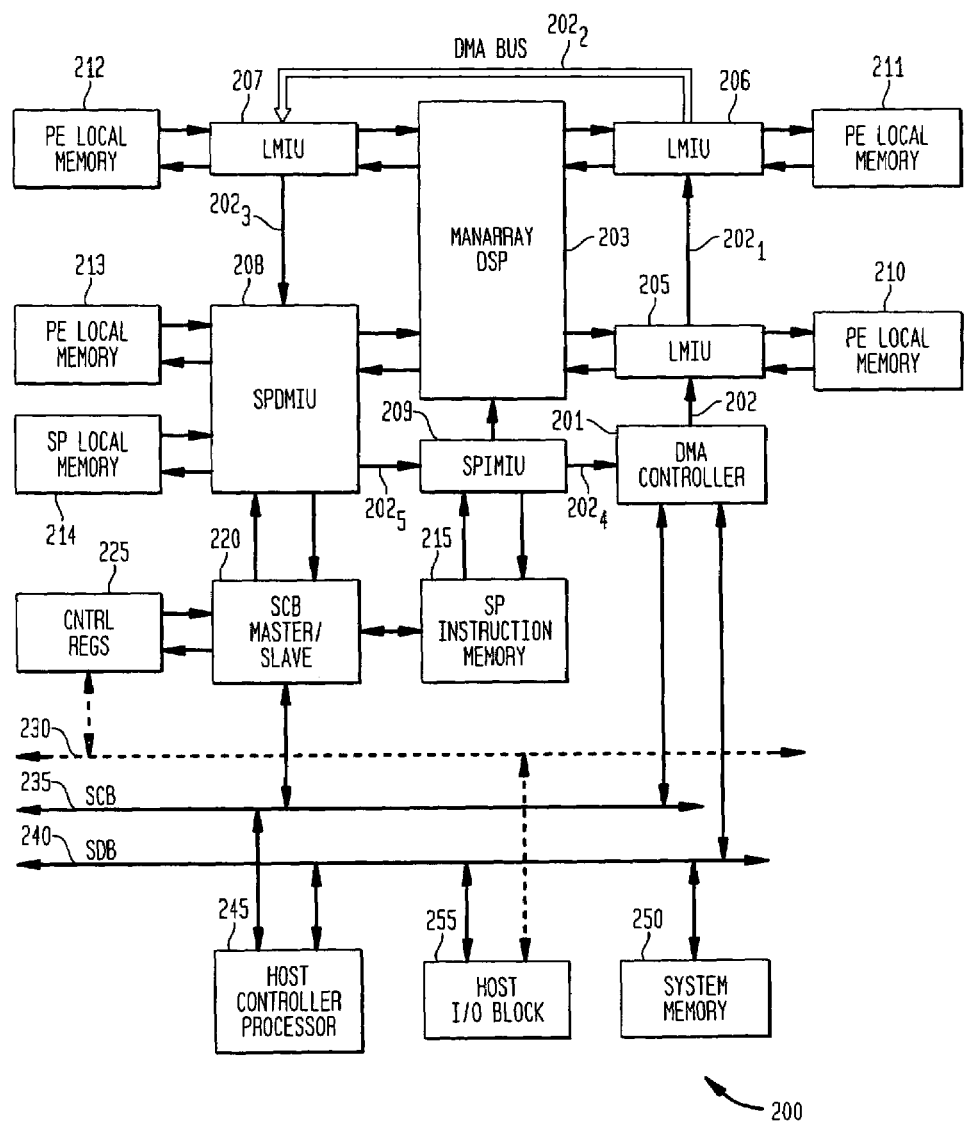
FIG. 2 shows a ManArray DSP with DMA controller in a representative system suitable for use in conjunction with the present invention.

FIG. 2 shows an exemplary system 200 which illustrates the context in which a ManArray DMA controller 201, in accordance with the present invention, resides. The DMA controller 201 accesses processor local memories 210, 211, 212, 213, 214 and 215 via the DMA bus 202, 2021, 2022, 2023, 2024, 2025 and the memory interface units 205, 206, 207, 208 and 209 to which it is connected. A ManArray DSP 203 also connects to its local memories 210–215 via memory interface units 205–209. Further details of a presently preferred DSP 203 are found in the above incorporated by reference applications. Although a ManArray DSP 203 is used in the preferred embodiment, the invention described herein may be used with any other processor which is coupled to an array or set of local memories such that the DMA controller has similar access capabilities.

In this representative system 200, the DMA controller 201 also connects to two system busses, a system control bus (SCB) 235, and the System Data Bus (SDB) 240. The DMA controller 201 is designed to transfer data between devices on the SDB 240, such as the system memory 250 and the DSP 203 local memories 210–215. The SCB 235 is used by an SCB master, such as the DSP 203 or a host control processor (HCP) 245, to access various system and DMA control registers. The DMA control registers are provided for initiating transfer or semaphore control operations and for reading transfer controller status. The SCB 235 is also used by the DMA controller 201 to send synchronization messages to other SCB bus slaves such as DSP control registers 225 and host I/O block 255. Some of the DSP control registers 225 act as "mailboxes" for receiving messages which may be sent by a DMA transfer controller or by another SCB master such as the HCP.

Figure 3:
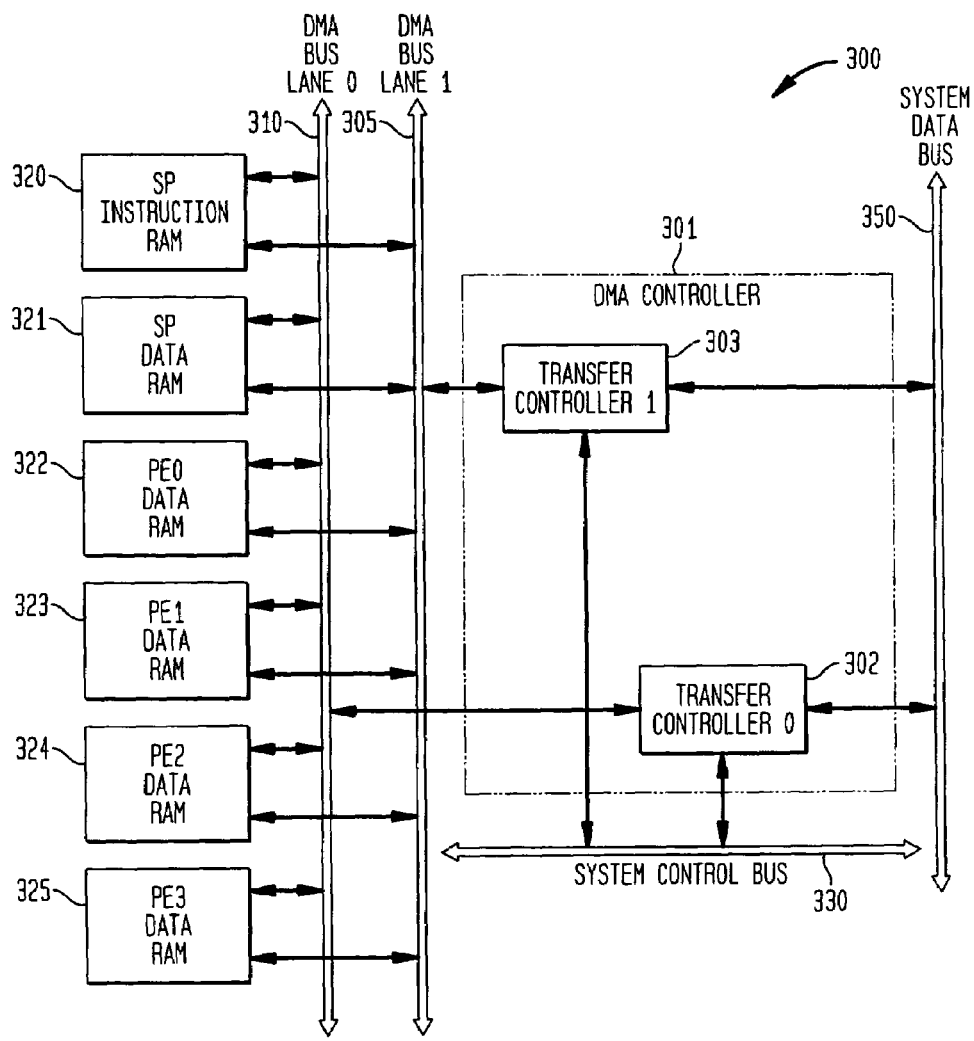
FIG. 3 shows a DMA controller implemented as a multiprocessor, with two transfer controllers, bus connections to a system memory, PE memories and a control bus.

FIG. 3 shows a system 300 which illustrates the operation of a DMA controller 301 which may suitably be a multiprocessor specialized to carry out data transfers utilizing one or more transfer controllers 302 and 303. Each transfer controller can operate as an independent processor or work together with other transfer controllers to carry out data transfers. DMA busses 305, 310 provide, in the presently preferred embodiment, independent data paths to processor local memories 320, 321, 322, 323, 324, 325, one bus "lane" consisting of address, control, and data signals for each of the transfer controllers 302 and 303. In addition, each transfer controller is connected to an SDB 350 and to an SCB 330. Each transfer controller operates as a bus master and a bus slave on both the SCB and SDB. As a bus slave on the SCB, a transfer controller may be accessed by other SCB bus masters in order to read its internal state or issue control commands. As a bus master on the SCB, a transfer controller can send synchronization messages to other SCB bus slaves. As a bus master on the SDB, a transfer controller performs data reads and writes from or to system memory or I/O devices which are bus slaves on the SDB. As a bus slave on the SDB, a transfer controller can cooperate with another SDB bus master in a "slave mode" allowing the bus master to read or write data directly from or to its data FIFOs (as discussed further below). It should be noted that the DMA busses 305 and 310, the SDB 350, and the SCB 330 may be implemented in different ways. For example, they may be implemented with varying bus widths, protocols, or the like consistent with the teachings of the present invention.

Figure 4:
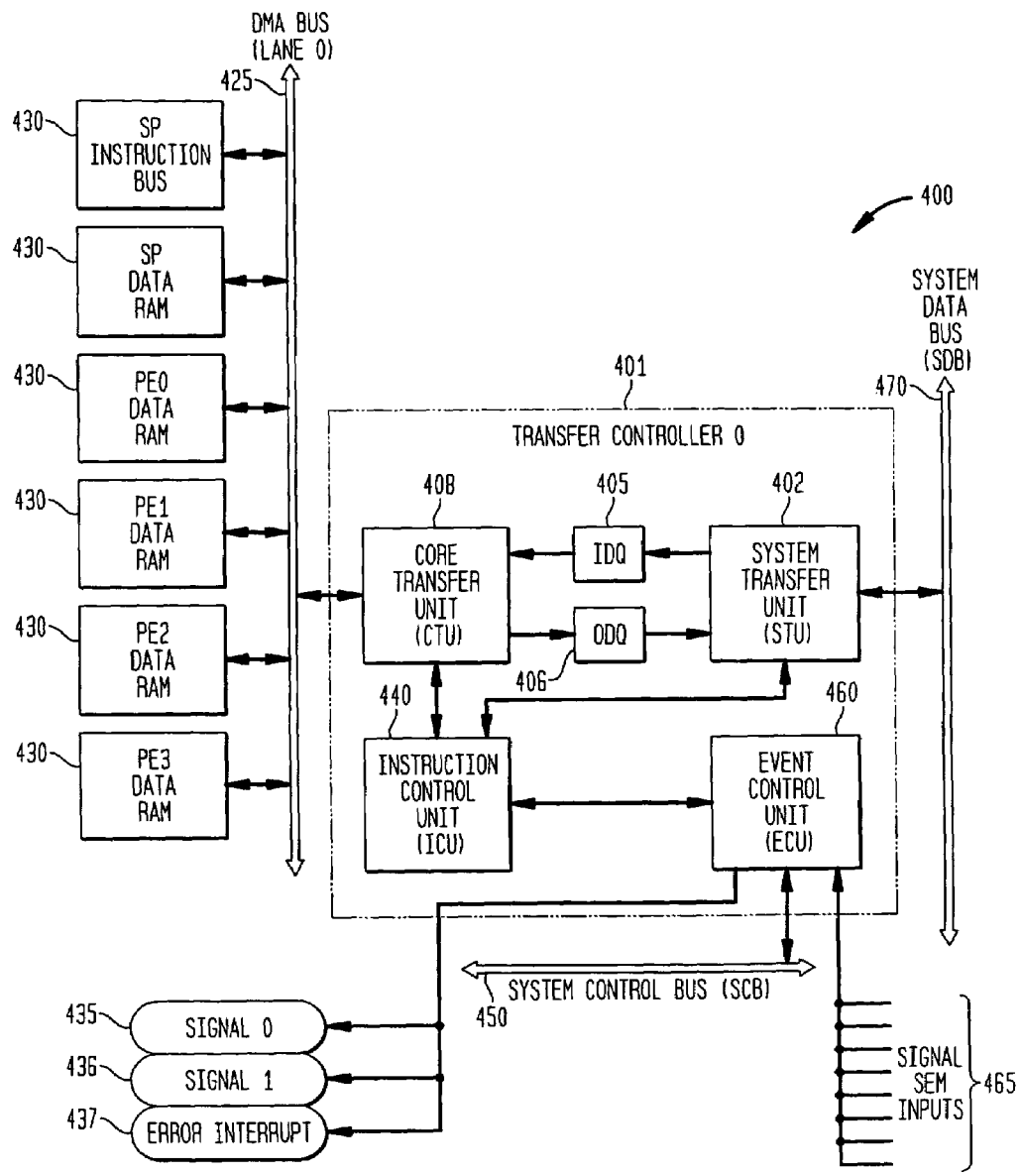
FIG. 4 shows a single transfer controller comprising four primary execution units, bus connections and FIFOs.

FIG. 4 shows a system 400 having a single transfer controller 401 comprising a set of execution units including an instruction control unit (ICU) 440, a system transfer unit (STU) 402, a core transfer unit (CTU) 408 and an event control unit (ECU) 460. The terms "core" and "local" in the text are used as adjectives to distinguish resources or components which are primarily used by and directly connected to the "core" processor versus those which are primarily used by or connected to a host control processor. The term "system" is used as an adjective when referring to resources used primarily by the host control processor. An inbound data queue (IDQ) 405 is a data FIFO buffer which is written with data from an SDB 470 under control of the STU 402. Data is read from the IDQ 405 under control of the CTU 408 to be sent to local memories 430, or sent to the ICU 440 in the case of instruction fetches. An outbound data queue (ODQ) 406 is a data FIFO which is written with data from DMA busses 425 under control of the CTU 408, to be sent to an SDB 470 device or memory under the control of the STU 402. The CTU 408 may also read DMA instructions from any one of the local memories attached to the DMA busses 425. These DMA instructions are then forwarded to the ICU 440 for initial decoding. The ECU 460 receives signal inputs from external devices 465, commands from the SCB 450, and instruction data from the ICU 440. It generates output signals 435, 436 and 437 which may be used to generate interrupts on host control processors within the system, and can act as a bus master on the SCB 450 to send synchronization messages to SCB bus slaves.

Each transfer controller within a ManArray DMA controller is designed to fetch its own stream of DMA instructions. DMA instructions are of five basic types: transfer; branch; load; synchronization; and state control. The branch, load, synchronization and state control types of instructions are collectively referred to as "control instructions", and distinguished from the transfer instructions which actually perform data transfers. DMA instructions in the exemplary system are typically of multi-word length and require a variable number of cycles to execute in order to minimize DMA instruction storage requirements. It will be apparent to those skilled in the art that other DMA instruction encodings, such as fixed-length encodings, might be chosen without departing from the teachings of the present invention. Although the preferred embodiment supports multiple DMA instruction types as described in further detail in U.S. patent application Ser. No. 09/471,217 entitled "Methods and Apparatus for Providing Data Transfer Control" filed Dec. 23, 1999 and incorporated by reference in its entirety herein, the present invention focuses on instructions and mechanisms which provide for flexible and efficient data transfers to and from multiple memories, including bit-reversed addressing across multiple PEs, multicast, and packing-gather operations.

Referring further to system 400 of FIG. 4, transfer-type instructions are dispatched by an ICU 440 for further decoding and execution by an STU 402 and a CTU 408. A "transfer-system-inbound" or TSI instruction moves data from SDB 470 to IDQ 405 and is executed by the STU 402. A "transfer-core-inbound" (TCI) instruction moves data from the IDQ 405 to the DMA Bus 425 and is executed by the CTU. A "transfer-core-outbound" (TCO) instruction moves data from the DMA Bus 425 to the ODQ 406 and is executed by the CTU. A "transfer-system-outbound" (TSO) instruction moves data from the ODQ 406 to an SDB 470 and is executed by the STU. Two transfer instructions are required to move data between an SDB system memory and one or more SP or PE local memories on the DMA bus, and both instructions are executed concurrently: a TSI, TCI pair or a TSO, TCO pair.

The address parameter of the STU transfer instructions, TSI and TSO, refers to addresses on the SDB while the address parameter of the CTU transfer instructions, TCI and TCO, refers to addresses on the DMA bus which target local memories.

FIG. 5 shows an exemplary instruction format 500 for transfer instructions. A base opcode field 501 indicates that the instruction is of transfer type. A C/S bit 510 indicates the transfer unit (CTU or STU) and I/O bit 520 indicates whether the transfer direction is inbound or outbound. Execute ("X") bit 550 when set to 1, indicates that the transfer should start immediately after decoding the transfer instruction. The execute bit provides one means of specifying a "start transfer" event. When the X bit is 0, the transfer parameters are decoded and loaded into the specified transfer unit, either the STU or the CTU, but the transfer is not initiated. Instruction fetch/decode continues normally until a "start transfer" event occurs. Data type field 530 indicates the size of each element transferred and address mode 540 refers to the data access pattern which must be generated by the transfer unit. A transfer count 560 indicates the number of data elements of size "data type" which are to be transferred to or from the target memory/device before an EOT occurs for that unit. An address parameter 570 specifies the starting address for the transfer. Other parameters 580 may follow the address word of the instruction, depending on the addressing mode used.

While there are six memories 210, 211, 212, 213, 214, and 215, shown in FIG. 2, the PE address modes access only the set of PE memories 210, 211, 212, and 213 in this exemplary ManArray DSP configuration. The address of a data element within PE local memory space is specified with three variables, a PE ID, a base value, and an index value. The base and the index values are summed to form a virtual offset into a PE memory relative to an address 0, the first address of that PE's memory. This virtual offset is then translated, via an address permutation and selection mechanism into a physical offset. The permutation and selection mechanism, together with PE ID translation, as described below, is designed to support data reorderings required for computations, such as FFT computations. The address of a PE data element may be thought of as a function of both the PE ID and the permuted sum of a base value and an index value:

PE data address=(PE ID, BitReversalSelect (Base+Index)), where the function "BitReversalSelect" is the permutation and selection function required to support FFT data reorderings within each local PE memory.

Figure 7:
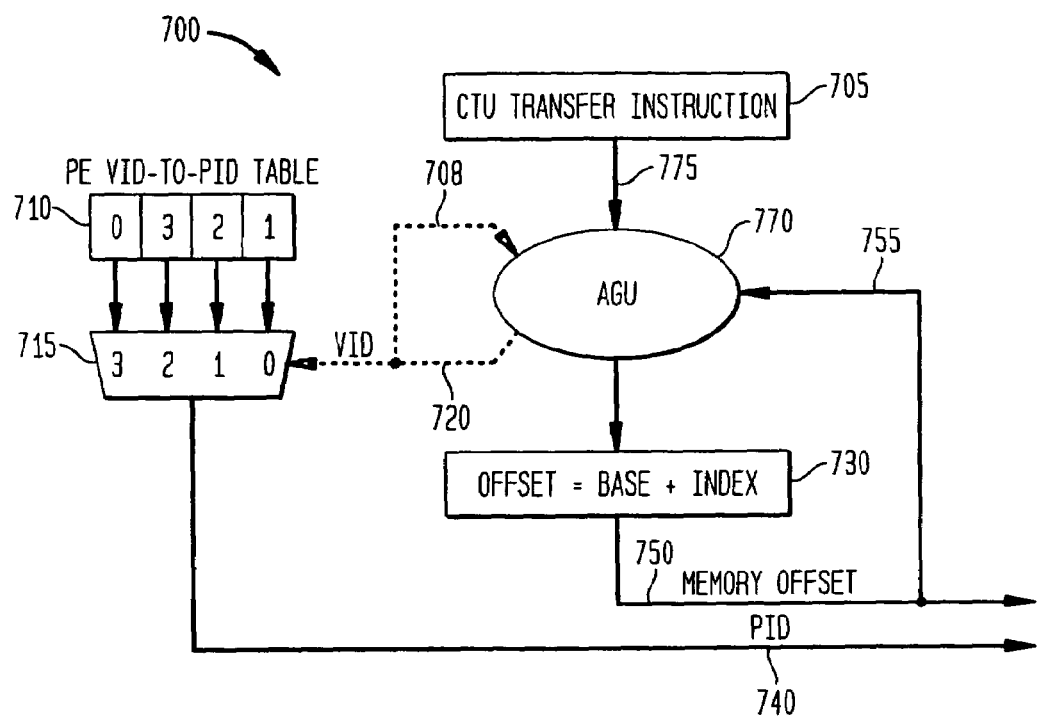
FIG. 7 shows an exemplary logical implementation of a system for virtual PE ID (VID) to physical PE ID (PID) translation.

The ManArray architecture incorporates a unique interconnection network between processing elements (PEs) which uses PE virtual IDs (VIDs) to support useful single-cycle communication paths, for example, torus and hyper-cube paths. In some array organizations, the PE's physical and virtual IDs are equal. The VIDs are used in the ManArray architecture to specify the pattern for data distribution and collection. When data is distributed according to the pattern established by VID assignment, then efficient inter-PE communication required by the programmer becomes available. To this end, FIG. 6 shows an exemplary table 600 illustrating one particular VID-to-PID translation. FIG. 7 shows an exemplary logical implementation of a system 700 for VID-to-PID translation. FIG. 8 shows an exemplary PExLAT instruction 800. FIG. 9 shows an exemplary VID-to-PID translation table register 900. Such aspects of a presently preferred embodiment are described in further detail in U.S. patent application Ser. No. 09/472,372 entitled "Methods and Apparatus for Providing Direct Memory Access Control" and filed Dec. 23, 1999.

For example, if a programmer needs to establish a hyper-cube connectivity for a 16 PE ManArray processor, the data will be distributed to the PEs according to a VID assignment in such a manner that the physical switch connections allow data to be transferred between PEs as though the switch topology were a hypercube even if the switch connections between physical PEs do not support the full hyper-cube interconnectivity. The present invention describes two approaches whereby the DMA controller can access PE memories according to their VIDs, effectively mapping PE virtual IDs to PE physical IDs (PIDs). The first uses VID-to-PID translation within the CTU of a transfer controller. This translation can be performed either through table-lookup, or through logic permutations on the VID. The second approach associates a VID with a PE by providing a programmable register within the PE or a PE local memory interface unit (LMIU) such as LMIUs 205, 206, 207 and 208 of FIG. 2, which is used by the LMIU logic to "capture" a data access when its VID matches a VID provided on the DMA Bus for each DMA memory access.

Bit-reverse PE addressing allows efficient scatter and gather of FFT data and coefficients. The DMA controller provides an efficient means for post-processing FFT calculations through its bit-reverse addressing capability. "Bit reversal" is a transposition of bits where the most significant bit (of a given "field" width) becomes least significant, and so on. For example, 0001011 will become 0011010 when the field width is 5 bits. "Digit reversal" is a transposition of groups of bits (a group of bits defines a digit) where the most significant digit becomes least significant and vice versa. For example, 0001011 will become 0111000 for field width 6 and digit width 2.

In general, an FFT and similar algorithms are faster when they produce out of order output. However, one can implement FFTs that preserve the ordering with some additional cost. The reordering depends upon the radix used:

| Radix | Reversal digit width |
|---|---|
| 2 | 1 |
| 4 | 2 |
| 8 | 3 |
| $2^k$ | k |

Algorithms with radix larger than 8 seem to be impractical for a number of reasons, so typically only digit widths 1–3 are encountered. Also, any algorithm is capable in processing its own output, meaning that if algorithm A takes in-order input and produces some of the above reversals, then for the inverse transform, algorithm A with a reversed input of the same kind, will produce an in-order output. Complications arise when one is faced with providing or dealing with a reversed ordering that is not the result of the algorithm at hand. For example, if an algorithm is required to: 1) take a distributed reversed output from the PEs and generate an in-order vector in external memory, or 2) take a distributed reversed output from the PEs and generate a bit-reversed vector, or 3) provide the inverse of either of the above two.

The offset or vector index can be considered to consist of two fields:

a) the distributed address (usually this is the PE id) consisting of the most significant bits, and b) the local address (rest of the bits).

To achieve 1) above, bit-reverse PE IDs and then digit reverse local address according to radix.

To achieve 2) above, only bit-reverse within the digits.

To specify a bit-reversal DMA operation, a "bit reversal code" is stored in a DMA register, BITREV, whose default value is 0 specifying no reversal. This register is read/writeable from the MCB. There is one BITREV register per transfer controller and this register is reset to 0 on DMA RESET. A presently preferred BITREV register encoding format 1000, is shown in FIG. 10. The exemplary system supports bit-reverse addressing for radix 2, 4, and 8 FFTs, which corresponds to digit widths of 1,2, and 3 bits respectively. The system also supports reversed orderings (1) and (2) above and FFT sizes 256, 512, 1024, 2048, 4096 and 8192 that use 6, 7, 8, 9, 10, and 11 bits per PE address, respectively These bit requirements are defined in the exemplary system to support 32-bit word addressing on the DMA busses so that the least significant 2 bits are assumed to be zero.

FIG. 11 shows an exemplary encoding table 1100 showing the encodings and purpose for each valid BitRev code for the encoding format 1000 of FIG. 10. More specifically, FIG. 11 shows how to program the BITREV register to achieve the bit-reversed address operation for different sizes of FFTs and the number of PEs N. For example, a radix 2 FFT of size 4096 to be processed on an N=4 (2×2) array would use (4096/4=1024) radix 2 line entry requiring BITREV to be set to 0x05 as shown on line 1105. If the same radix 2 and 4096 point FFT is to be processed on an N=8 (2×4) array the (4096/8=512) radix 2 line entry would be used requiring BITREV to be set to 0x04 as seen on line 1106. PEXLAT must also be loaded to achieve the specified bit-reversed address operation. PEXLAT is a register that may be loaded either by MCB write access or by a DMA instruction. It specifies the order in which PEs are accessed for PE addressing modes. Note for Cooley-Tukey FFTs PEXLAT for inbound transfers is {0,1,2,3} and for outbound transfers the ordering is {0,2,1,3}. Details of an exemplary PEXLAT instruction 800 are shown in FIG. 8. Note for this example that PE address bits [1:0] are always assumed to be zero since they are not routed to the PEs, since DMA transfers, in the present exemplary system, are only in 32-bit words. The PE address bits for each valid BitRev code encoding with their corresponding (triple) are shown in table 1200 of FIG. 12. Using a 5-bit "bit reversal" code, which is always fed into a PE address output multiplexer, there are 17 possible variations as shown in FIG. 12, with a code value of 00000 corresponding to "no reversal" of bits.

A PE operation code refers to a set of signals and cycle types on the DMA bus which specify operations to be performed at the local memory interface unit (LMIU), or within the PEs themselves. In particular, this signal group is used to specify operations such as:

Start-Of-Sequence,
End-Of-Sequence,
A specific PE which is to send/receive data,
A group of 2 or more PEs which are to receive data,
A group of PEs which are to send data on specific data lines of the DMA Bus (each PE uses a set of wires depending on its PE ID using virtual or physical IDs, depending on implementation,
A group of PEs which are to read data from specific data lines of the DMA Bus (each PE uses a set of wires depending on its PE ID (virtual or physical, depending on implementation),
DMA virtual channel ID used to control the update of semaphores associated with local memory access by PEs or DMA lane, or
Other operations best carried out in a PE-relative fashion, or at the local memories.

One basic idea is that a small group of signals included in the opcode bus can be used to specify things like:

Load PE Opcode—a bit that says that corresponding data is a PE Opcode,
Enable PE Opcode—a bit that enables the use of the PE Opcode in LMFU on current data,
Disable PE Opcode—a bit that disables use of the PE opcode in LMIU on current data,
Data Operation—a bit that specifies that the access is a data operation using current setting of PE Opcode (if not disabled), or
PE ID—indicates a specific PE address for normal data accesses (no PE Opcode used).

In addition, it is noted that using a small set of signals, the data bus can be used to specify a PE opcode. One of the bits in the set of signals indicates that the cycle type is "Load new PE Opcode". The PE opcode state is disabled when the last cycle of a transfer is presented to the LMIU.

PE Multicast Addressing

PE multicast addressing refers to parallel distribution of the same data element to more than one, and up to all, PEs simultaneously. In other words, for the all PE case it refers to a "broadcast" operation. Multicast addressing is specified as a set of addressing modes in the TCI instruction, as in the address mode field 540 of FIG. 5. In addition, another parameter in the transfer instruction specifies which PEs are to accept the data transfer. Three exemplary approaches to such specification are as follows:

A 16 bit field can support the specification of any combination of up to 16 PEs to receive the same data element.

A 4 bit number can specify any set of 16 PEs to receive the same data element when used in combination with the PE VID-to-PID translation table. The 4 bit number N, where '0' implies the value N='16', specifies that the first N elements in the translate table are to be selected to receive the data element. Since the translate table can specify PEs in any order, any group of PEs may be selected to receive the data.

An encoded M-bit value can be used to specify selected, common combinations of PEs to receive data simultaneously.

It is further noted that multicast addressing can be used along with block, stride and circular addressing to any group of PEs.

The PE relative packing-gather operations type indicates that each PE drives data onto a different group of data wires to return to the transfer controller ODQ. For example, a byte size gather over 4 PEs would specify that each PE supplies one byte of a 32-bit word to be returned to the ODQ for transfer to the system data bus. Other data types may be supported, with varying numbers of PEs participating in the gather operation.

In a PE relative gather-sum operations, a specified number of data elements are summed as they are read from local memories. If the summing parameter is N, then a single data element is transferred to the ODQ for every N elements read from local memories. The N elements are summed with the result being placed in the ODQ for transfer to the system data bus.

The PE Relative Unpack-Distribute Operations type indicates that each PE LMIU receives data from a different group of data wires to be written to its local memory. For example, a byte size unpack-distribute over 4 PEs would specify that each PE reads one byte of a 32-bit word to be subsequently written to the local memory. Optional zero-extend, sign-extend or one-extend may be supported. Other data types may be supported, such as halfwords, with varying numbers of PEs participating in the gather operation. The DMA Bus width influences the number of useful data types which might be supported.

Additionally, data may be permuted before being sent to PEs for inbound transfers, or before being sent to system memories for outbound transfers. Besides reordering of data within a data element, other stream oriented operations may be performed including masking, data merging such as AND with a mask followed by OR with a constant, complementation using XOR with a specified mask.

While the present invention is disclosed in a presently preferred context, it will be recognized that the teachings of the present invention may be variously embodied consistent with the disclosure and claims. By way of example, the present invention is disclosed in connection with specific aspects of the ManArray architecture. It will be recognized that the present teachings may be adapted to other present and future architectures to which they may be beneficial.

We claim:

1. An array processing system comprising:
a digital signal processor (DSP);
a direct memory access (DMA) controller;
a plurality of processing element (PE) local memories;
a direct memory access bus utilized by the DMA controller to access the plurality of PE local memories;
a system memory;
a system control bus (SCB) connected to the DMA controller; and
a system data bus (SDB) connecting the DMA controller and a plurality of devices, wherein the DMA controller transfers data between the plurality of devices on the SDB.

2. The array processing system of claim 1 wherein the system memory is on the SDB and the plurality of PE local memories are on a direct memory access bus as controlled by the DMA controller to move data between the system memory and the plurality of PE local memories.

3. The array processing system of claim 1 wherein the DSP functions as an SCB master and utilizes the SCB to program the DMA controller with read and write addresses and register values to initiate control operations and read status.

4. The array processing system of claim 1 further comprising a host processor connected to the SCB, and which both functions as an SCB master and utilizes the SCB to program the DMA controller with read and write addresses and register values to initiate control operations and read status.

5. The array processing system of claim 1 wherein the DMA controller further utilizes the SCB to send synchronization messages to other SCB bus slaves.

6. The array processing system of claim 5 wherein the other SCB bus slaves comprise DSP control registers or a host input/output block.

7. The array processing system of claim 5 further comprising a host processor connected to the SCB, and wherein the DSP or the host processor can poll registers in bus slaves on the SCB to receive status data from the DMA controller.

8. The array processing system of claim 1 wherein the DMA controller operates to perform write operations to slave addresses which are programmed to cause interrupt side effects to the DSP allowing DMA controller messages to be handled by interrupt service routines.

\* \* \* \* \*